United States Patent [19]
Nishiyama

[11] Patent Number: 5,664,238
[45] Date of Patent: Sep. 2, 1997

[54] FOCAL CONTROLLER OF CAMERA

[75] Inventor: Kiyoharu Nishiyama, Tokyo, Japan

[73] Assignee: Ricoh Company, Ltd., Tokyo, Japan

[21] Appl. No.: 548,154

[22] Filed: Oct. 25, 1995

[30] Foreign Application Priority Data

Nov. 28, 1994 [JP] Japan ................... 6-293086
Dec. 7, 1994 [JP] Japan ................... 6-303832

[51] Int. Cl.⁶ ............................................. G03B 13/36
[52] U.S. Cl. .................. 396/101; 396/135; 348/355
[58] Field of Search ........................ 396/101, 135, 396/136; 348/353–356

[56] References Cited

U.S. PATENT DOCUMENTS 4,990,947  2/1991  Komiya et al. .

FOREIGN PATENT DOCUMENTS

0 341 695  11/1989  European Pat. Off. .
0 512 430  11/1992  European Pat. Off. .

*Primary Examiner*—W. B. Perkey
*Attorney, Agent, or Firm*—Oblon, Spivak, McClelland, Maier & Neustadt, P.C.

[57] ABSTRACT

In a focal controller of a camera, two brightness components in different frequency bands are obtained by two band pass filters from a video signal obtained by image pickup. Integral values a and b of the respective brightness components are detected by integrating circuits. When both a ratio a/b and a value a calculated by an arithmetic circuit are increased, a CPU judges this increase as an unfocusing position of a focusing lens. In contrast to this, when an increasing degree of the ratio a/b is decreased or tends to be decreased, the CPU judges this decrease as a position near a focusing position of the focusing lens. Thus, the driving speed of a focusing motor is set to a high speed in the unfocusing position and is set to a low speed in the position near the focusing position. For example, a microcomputer obtains a focal evaluation value at an interval of three fields (k+2 after k−1) in the vicinity of a focusing position and compares this focal evaluation value with reference data.

5 Claims, 5 Drawing Sheets

FOCAL CONTROLLER OF CAMERA

BACKGROUND OF THE INVENTION

1. Field of the Invention

The present invention relates to a focal controller applied to a camera such as a video camera, an electronic still camera, etc. having a solid-state image sensor.

2. Description of the Related Art

An automatic focusing system (a so-called mountaineering servo system) using a video signal as a focal evaluation value is generally adopted in a video camera, etc. However, in this system, a focusing motor is driven while the focal evaluation value is basically obtained every one field and is compared with a reference value. Accordingly, this system has a problem of increasing a focusing time.

Further, there is a case in which scatter in characteristic curve of an evaluation value relative to a brightness component is caused by a photographed subject, its condition, noises, etc. In this case, the focusing motor is driven at a high speed even near a focusing position. Therefore, an overrunning amount of the focusing lens with respect to the focusing position is large so that a pickup image becomes bad in appearance. Further, a focusing time of the focusing lens is increased in accordance with the overrunning amount.

SUMMARY OF THE INVENTION

It is therefore a first object of the present invention to provide a focal controller of a camera for increasing a focusing speed without reducing a focusing accuracy in focusing control using a mountaineering servo system by moving a focusing lens at a high speed when no focusing lens is located near a focusing position, and moving the focusing lens at a low speed when the focusing lens is located near the focusing position.

A second object of the present invention is to provide a focal controller of a camera for more reliably and accurately increasing a focusing speed and improving a focusing accuracy.

In accordance with a first construction of the present invention, the above first object can be achieved by a focal controller of a camera in which a focusing signal is obtained from a change in brightness component among a video signal obtained by image pickup and a focusing operation is controlled on the basis of this focusing signal;

the focal controller comprising:
  means for detecting an increase and a decrease in ratio of brightness components in two arbitrary different frequency bands;
  means for detecting an increase and a decrease in brightness component in one of the frequency bands; and
  means for changing the driving speed of a focusing motor for moving a focusing lens on the basis of judged results of an unfocusing position and a position near a focusing position obtained by detected results of both the detecting means.

In accordance with a second construction of the present invention, the focal controller further comprises means for changing the relation between a threshold value for detecting the increase in brightness component and a threshold value for detecting a maximum value after the detection of this increase in accordance with the unfocusing position and the position near the focusing position.

In the above focal controller of a camera in the first construction of the present invention, an evaluation value is obtained by integrating the brightness component. The focusing lens is located near the focusing position when no ratio of evaluation values of two brightness components in different frequency bands is increased and an evaluation value of one of the brightness components in one frequency band is increasing. Accordingly, the focusing motor for moving the focusing lens is driven at a low speed. The focusing motor is driven at a high speed in the unfocusing position except for the position near the focusing position. Thus, a focusing accuracy of the focusing lens can be improved near the focusing position. Further, the focusing lens can be moved at a high speed until the position near the focusing position.

When the evaluation value is increasing in excess of a first threshold value $\Delta k1$, an evaluation value $Y_{max}$ and a position $P_{max}$ of the focusing lens at this time are stored and the focusing lens is further moved in the same direction. When an evaluation value greater by a second threshold value $\Delta k2$ than $Y_{max}$ is detected, this detected value is set to $Y_{max}$ and $P_{max}$ is simultaneously updated. This processing is repeated until an evaluation value smaller by the first threshold value $\Delta k1$ than the evaluation value obtained just before is detected as the present evaluation value. When this smaller value is detected, the position of $P_{max}$ shown by the detected value $Y_{max}$ is considered as a focusing point and the focusing lens is returned until a position of this focusing point.

Thereafter, the above operation is performed when a change in evaluation value is detected. A focusing accuracy and a focusing speed of the focusing lens can be improved by suitably setting the above values $\Delta k1$ and $\Delta k2$.

In accordance with a third construction of the present invention, the above second object can be achieved by a focal controller of a camera in which a focusing signal is obtained from a change in brightness component among a video signal obtained by image pickup and a focusing operation is controlled on the basis of this focusing signal;

the focal controller comprising:
  means for detecting an increase and a decrease in ratio of brightness components in two arbitrary different frequency bands;
  means for detecting an increase and a decrease in brightness component in one of the frequency bands; and
  comparing means for judging a position near a focusing position and an unfocusing position by detected results of both the detecting means, and constructed such that
  the comparing means sets the driving speed of a focusing motor for moving a focusing lens to a predetermined speed and obtains the detected results and makes a comparative arithmetic calculation of the detected results for a predetermined period when the unfocusing position is judged; and
  the comparing means sets the driving speed of the focusing motor to a speed lower than the predetermined speed and obtains the detected results and makes the comparative arithmetic calculation for a period longer than the predetermined period when the position near the focusing position is judged.

In accordance with a fourth construction of the present invention, the focusing motor in the third construction is driven in synchronization with the period for obtaining the detected results and making the comparative arithmetic calculation such that the driving speed of the focusing motor is limited to a speed providing a predetermined moving amount of the focusing lens every this period.

In accordance with a fifth construction of the present invention, the focusing motor in the third or fourth construction is gradually driven at a low speed just after the position near the focusing position is first judged from the detected results, and when the same judgment is made later.

In the above focal controller of a camera in the third construction of the present invention, an evaluation value is obtained by integrating a brightness component. It is judged as the position near the focusing position when no ratio of evaluation values of two brightness components in different frequency bands is increasing, but the evaluation value of a brightness component in one frequency band is increasing. In this case, the focusing motor for moving the focusing lens is driven at a low speed. Further, for example, the evaluation value is obtained and is compared with reference data at an interval of three fields. The focusing motor is driven at a high speed in the unfocusing position except for the position near the focusing position. Further, the evaluation value is obtained and is compared with reference data every field. Thus, an overrunning amount of the focusing lens with respect to the focusing position can be reduced in the vicinity of the focusing position. Further, a focusing accuracy of the focusing lens can be improved and the focusing lens can be moved at a higher speed until the position near the focusing position.

At the time of a high speed driving mode of the focusing lens, no focusing lens is moved at one time by a required moving amount. For example, no focusing lens is moved at one time by six steps in this mode. In the present invention, for example, the focusing lens is moved at an interval of two steps in synchronization with the period for obtaining the evaluation value and making the comparative arithmetic calculation. Thus, influences of the motor drive on the evaluation value as a compared object are reduced so that the evaluation value can be compared with reference data with high accuracy.

For example, as mentioned above, the focusing motor is first driven by three steps at the time of the high speed driving mode of the focusing lens even when it is necessary to drive the focusing motor by six steps. As a result, when the obtained evaluation value is reduced for the first time, the focusing motor is driven with the next step as one step. Thus, the reduction in evaluation value can be reliably detected and overrun of the focusing lens with respect to the focusing position is prevented.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a focal controller of a camera in the present invention will next be described in detail with reference to the accompanying drawings.

Figure 1:
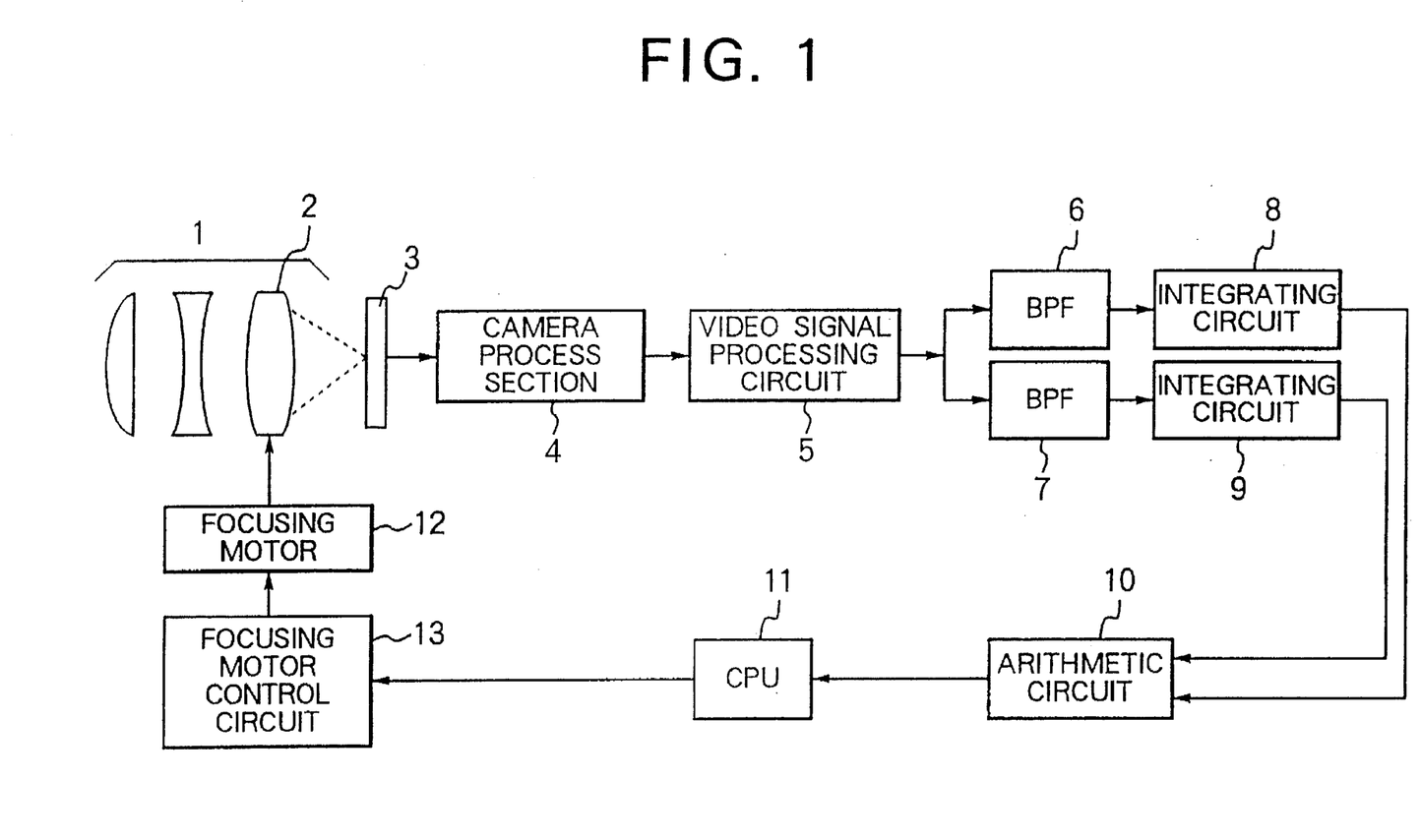
FIG. 1 is a block diagram showing the schematic construction of a focal controller of a camera in accordance with a first embodiment of the present invention.

FIG. 1 is a block diagram showing the schematic construction of a focal controller of a camera in accordance with a first embodiment of the present invention. An image pickup lens system 1 is constructed by a plurality of lens groups including a focusing lens 2. An image pickup element 3 is constructed by a charge coupled device (CCD), etc. for receiving an image of a photographed subject focused and formed by the image pickup lens system 1 and photoelectrically converting this image. A camera process section 4 outputs an output of the image pickup element 3 as a video signal. A video signal processing circuit 5 processes various kinds of signals with respect to the video signal and separates a brightness signal from these signals and outputs the separated brightness signal. Two band pass filters (BPFs) 6 and 7 have different cut-off frequencies. For example, passing bands of the band pass filters 6 and 7 are respectively set to 100 kHz and 500 kHz.

Two integrating circuits 8 and 9 respectively integrate brightness components outputted from the band pass filters 6 and 7 in two frequency bands and output evaluation values for focusing. An arithmetic circuit 10 receives the evaluation values from both the integrating circuits 8 and 9 and make various kinds of calculations described later. A microcomputer (CPU) 11 controls operations of respective constructional portions of the focal controller. A focusing motor 12 moves the focusing lens 2. A focusing motor control circuit 13 controls an operation of the focusing motor 12.

The present integral value of an output of the band pass filter 8 is set to an evaluation value a and a previous integral value is set to an evaluation value a'. Similarly, the present integral value of an output of the band pass filter 7 is set to an evaluation value b and a previous integral value is set to an evaluation value b'. In this case, the above arithmetic circuit 10 calculates a–a', a/b, a'/b', and a/b –a'/b' and outputs these calculated results to the CPU 11.

Figure 2:
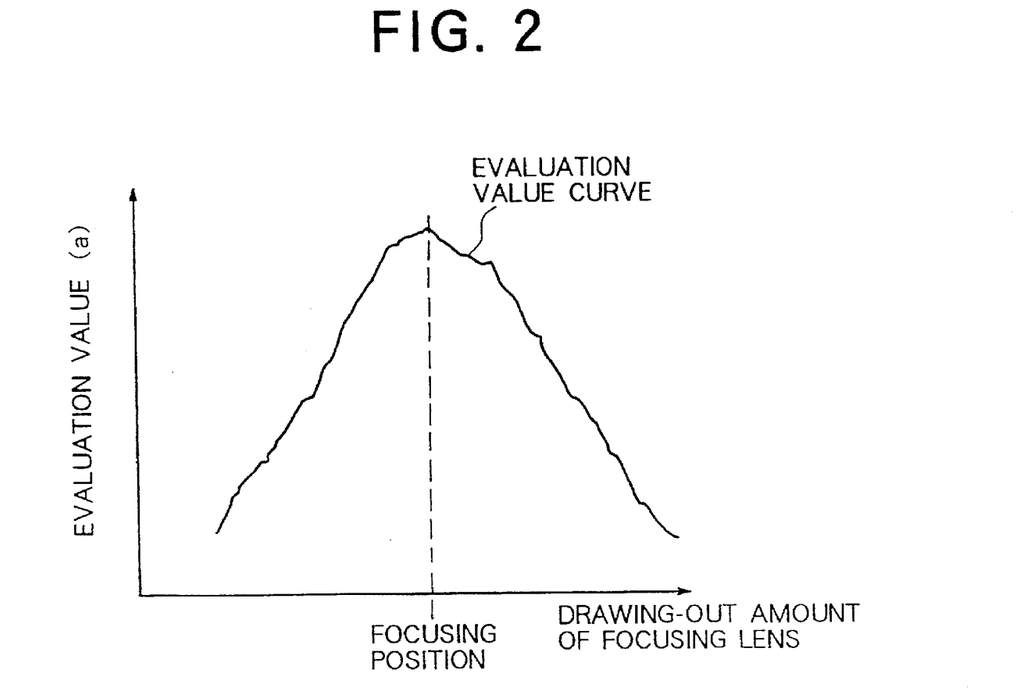
FIG. 2 is a graph showing the relation between an evaluation value and a drawing-out amount of a focusing lens.

FIG. 2 shows one example of a curve of the evaluation value a of the band pass filter 6 plotted with a position (a drawing-out amount) of the focusing lens 2 as a parameter. The evaluation value curve has an angular shape as a whole. A top portion of the evaluation value curve corresponds to a focusing position. The focusing lens 2 gradually approaches the top portion from an initial position by a drawing-out movement thereof in focusing control based on the evaluation value. This is a so-called mountaineering servo.

Figure 3:
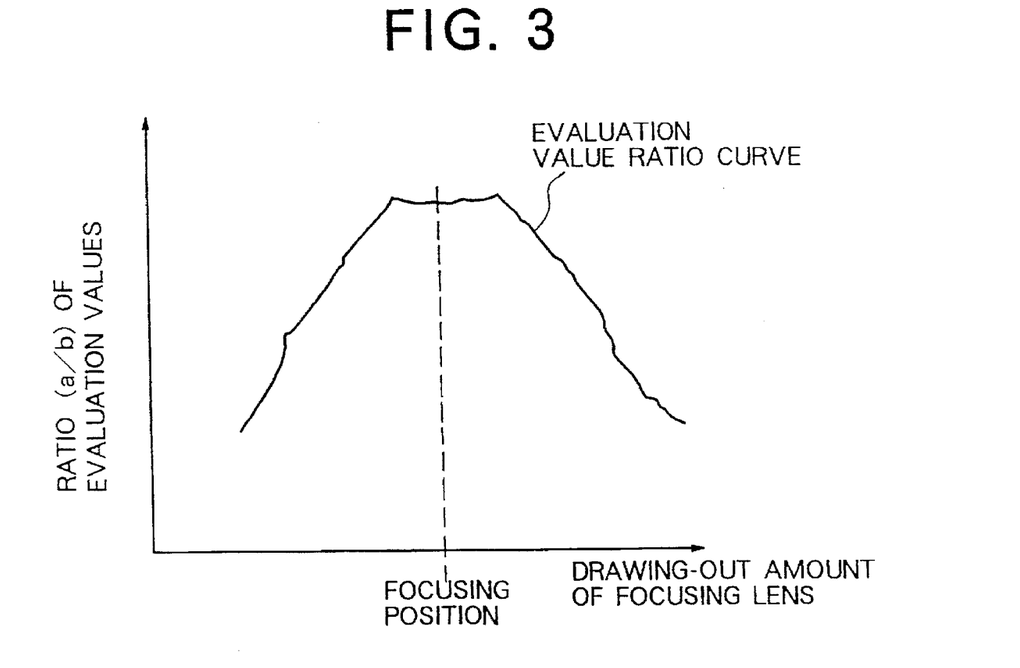
FIG. 3 is a graph showing the relation between a ratio of evaluation values and the drawing-out amount of the focusing lens.

FIG. 3 shows one example of a curve of an evaluation value ratio in which a ratio a/b of the evaluation values a and b respectively provided from the band pass filters 6 and 7 is plotted with a position of the focusing lens 2 as a parameter.

As can be seen from FIGS. 2 and 3, both the values a and a/b are increased from an unfocusing position to a position near the focusing position. An increasing degree of the ratio a/b is reduced or tends to be reduced in the vicinity of the focusing position.

Figure 4:
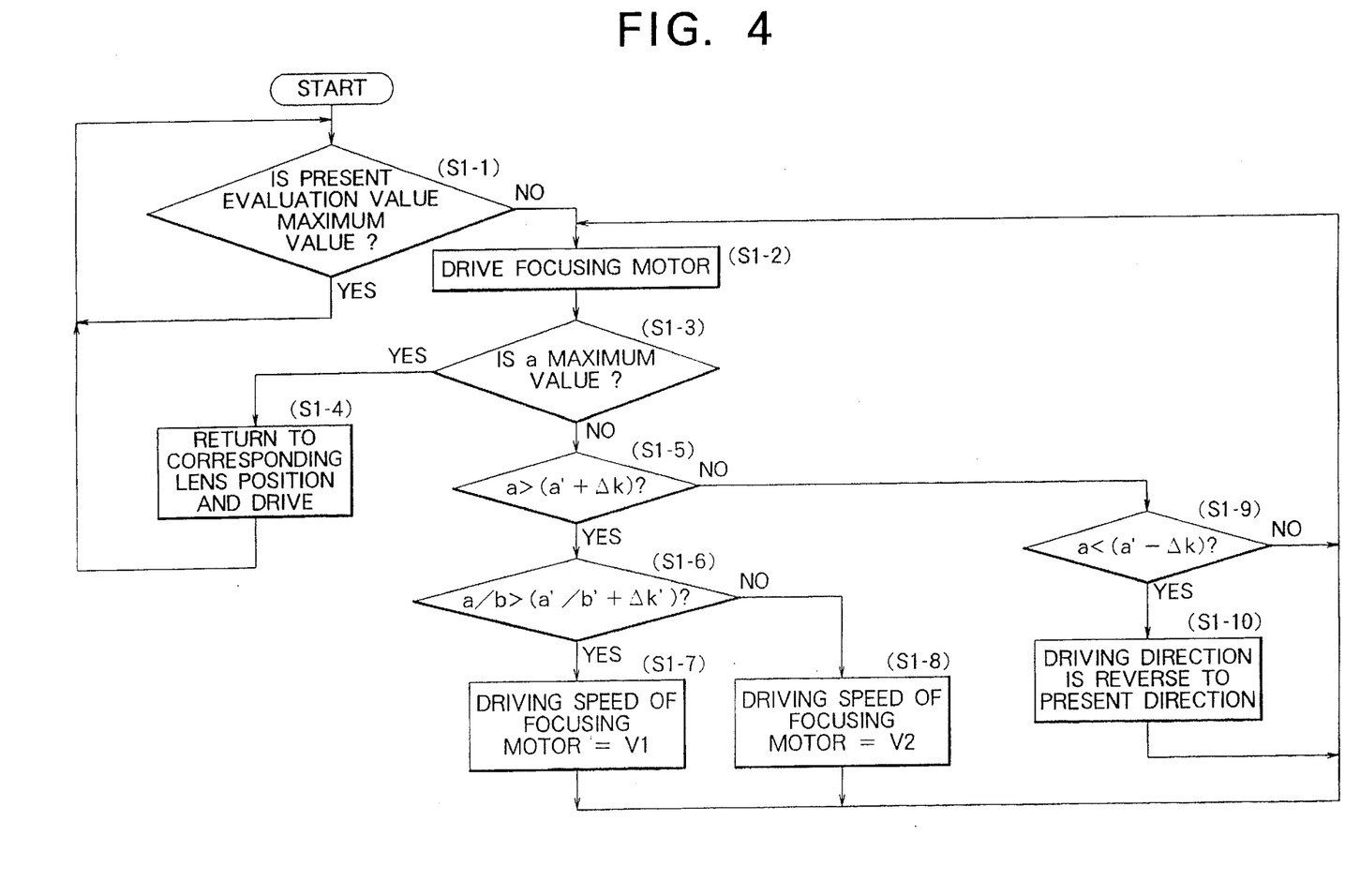
FIG. 4 is a flow chart relative to control of a focusing motor in the focal controller of a camera in the first embodiment of the present invention.

In the first embodiment, the operation of the focusing motor 12 shown in the flow chart of FIG. 4 is controlled on the basis of the above evaluation values a, a', b and b'.

In FIG. 4, when no present evaluation value a is a maximum value, a judgment in a step S1-1 is NO. In this case, the focusing motor 12 is drawn out in a step S1-2 and the evaluation value a is judged. If this evaluation value a is a maximum value, a judgment in a step S1-3 is YES. In this case, the focusing motor 12 is driven in a step S1-4 such that the focusing lens 2 is returned to a lens position corresponding to the evaluation value a showing this maximum value.

In the above step S1-3, when no evaluation value a is the maximum value, the judgment in the step S1-3 is NO. In this case, a>(a'+$\Delta$k) is judged in a step S1-5 and a/b>(a'/b'+$\Delta$k') is judged in a step S1-6. Evaluation values a, a', b and b' are changed by drawing-out the focusing lens 2. $\Delta$k is a preset threshold value with respect to the evaluation value a. $\Delta$k' is a preset threshold value with respect to the evaluation value ratio a/b. When the judgments in the steps S1-5 and S1-6 are YES, the values a and a/b are respectively increasing in excess of the threshold values $\Delta$k and $\Delta$k'. Accordingly, it is judged that the focusing lens is located in an unfocusing position. Thus, the focusing motor 12 is driven at a high speed V1 in a step S1-7 so that a reaching time from the unfocusing position to a position near the focusing position is shortened.

However, when a/b>(a'/b'+$\Delta$k') is not formed in the above step S1-6, the judgment in the step S1-6 is NO. In this case, the value a is increasing, but no ratio a/b is increasing. Accordingly, it is judged that the focusing lens is located near the focusing position. Thus, the focusing motor 12 is driven at a low speed V2<V1 in a step S1-8 so that a focusing accuracy is improved by facilitating focusing control near the focusing position.

When a>(a'+$\Delta$k) is not formed in the above step S1-5 and a<(a'-$\Delta$k) is not formed in a step S1-9, the judgments in the steps S1-5 and S1-9 are NO. In this case, it is returned to the step S1-2 so that the focusing lens 2 is further drawn out in a forward direction. In contrast to this, when a>(a'+$\Delta$k) is not formed in the step S1-5 and a<(a'-$\Delta$k) is formed in the step S1-9, the judgment in the step S1-5 is NO and the judgment in the step S1-9 is YES. In this case, it is judged that the focusing lens is located at a focal point. The focusing lens 2 is moved until this focal position in an opposite direction in a step S1-10. The movement of the focusing lens 2 is then stopped.

Figure 5:
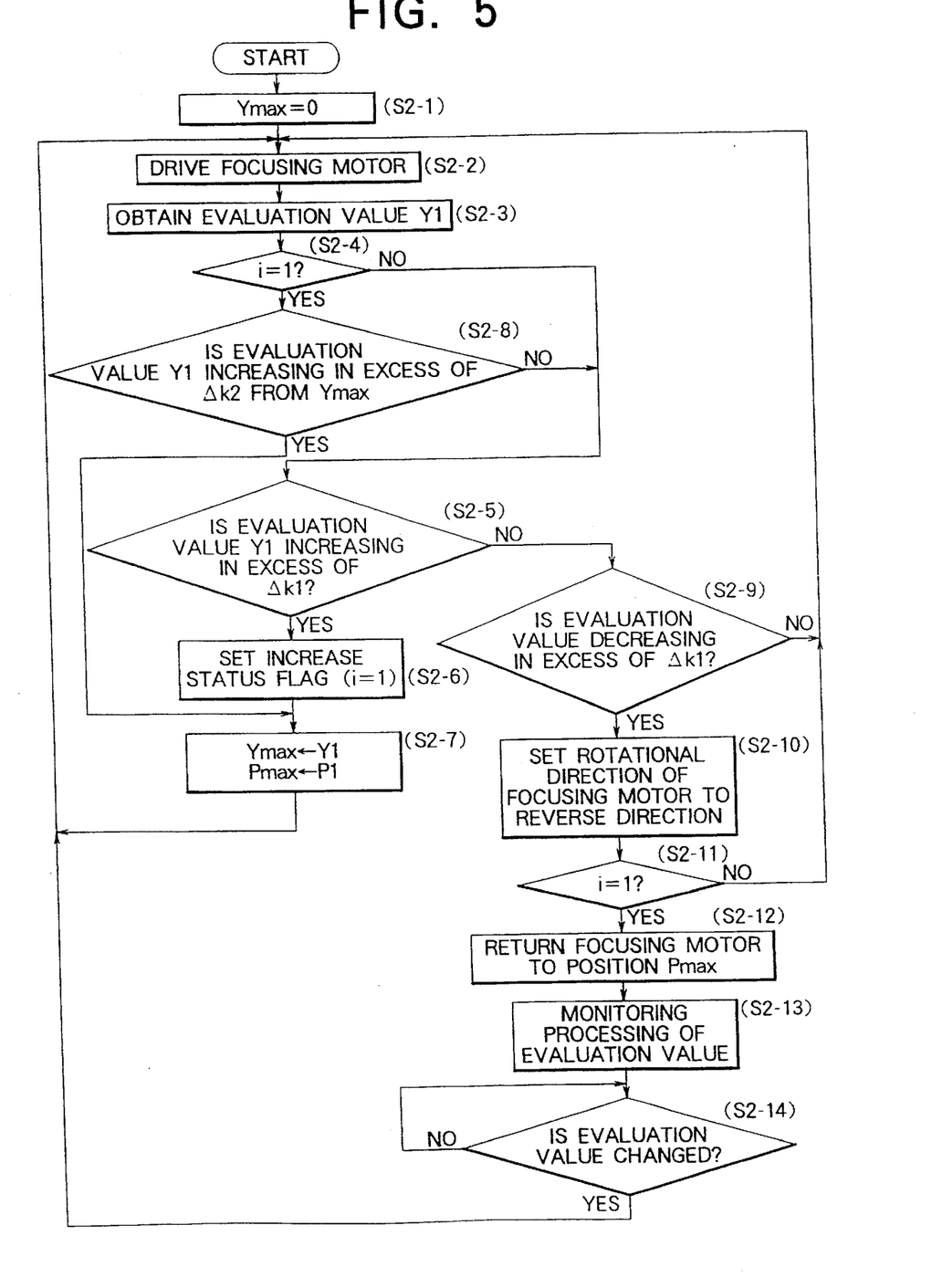
FIG. 5 is a flow chart relative to control of a focusing motor in the focal controller of a camera in accordance with a second embodiment the present invention.

FIG. 5 is a flow chart relative to control of a focusing motor in a focal controller of a camera in accordance with a second embodiment of the present invention. In this second embodiment, as explained in FIGS. 2 and 3, the focusing motor is driven in a constant direction and a brightness component among a video signal obtained by image pickup is accumulated so that an evaluation value is obtained. The focal controller in the second embodiment has a construction similar to that explained with reference to FIG. 1.

In FIG. 5, a maximum value $Y_{max}$ of an evaluation value is first initialized in a step S2-1. In a step S2-2, a focusing lens 2 is drawn out by a focusing motor 12 in a forward direction. Similar to the above first embodiment, an evaluation value Y1 is obtained in a step S2-3. When this evaluation value Y1 is increasing in excess of a first threshold value $\Delta$k1, a judgment in a step S2-4 is NO and a judgment in a step S2-5 is YES. In this case, an increasing status flag i is set to 1 in a step S2-6. In a step S2-7, the evaluation value Y1 and a position P1 of the focusing lens at this time are respectively stored as maximum values $Y_{max}$ and $P_{max}$. A drawing-out amount of the focusing motor can be used as this position P1. Then, it is returned to the step S2-2 and the focusing motor 12 is further driven in the forward direction so that the evaluation value Y1 is obtained.

When the value Y1 is a value in excess of the second threshold value $\Delta$k2($\Delta$k1>$\Delta$k2) with respect to the above $Y_{max}$, a judgment in a step S2-8 is YES. In this case, this value Y1 is set to $Y_{max}$ and $P_{max}$ is simultaneously updated in the step S2-7. This processing is repeated in a step S2-9 until an evaluation value smaller by the first threshold value $\Delta$k1 than the evaluation value obtained just before is detected as the present evaluation value. When this evaluation value is detected in the step S2-9, this judgment in this step is YES. Thus, the position of $P_{max}$ showing the detected value $Y_{max}$ is considered as a focusing position and a rotational direction of the focusing motor 12 is set to an opposite direction in a step S2-10. In steps S2-11 and S2-12, the focusing lens 2 is returned to the position of $P_{max}$. Then, the movement of the focusing lens 2 is stopped.

Thereafter, a monitoring mode of the evaluation value is started in a step S2-15. When a change in evaluation value is detected in a step S2-14, a judgment in this step is YES. In this case, it is returned to the step S2-2 and the above-mentioned operation is performed so that the above $\Delta$k1 is set to a suitable value. Thus, the influences of an error in operation of the focal controller caused by noises can be reduced. Further, an overrunning amount of the focusing lens 2 with respect to the focusing position can be minimized by setting the above value $\Delta$k2 to a suitable value so that a focusing speed of the focusing lens 2 can be increased.

It is also considered that the above arithmetic operation of the above arithmetic circuit 10 in each of the embodiments is performed by the CPU 11.

As explained above, in a first construction of the present invention, the focal controller of a camera detects an increase or decrease in ratio of brightness components in two different frequency bands and an increase or decrease in one of these brightness components. The driving speed of a focusing motor is controlled by these detected results in an unfocusing position and a position near a focusing position. Thus, both focusing speed and accuracy of a focusing lens can be improved.

In a second construction of the present invention, a threshold value for detecting the above increase in brightness component is set to be different from a threshold value for detecting a maximum value after this increase is detected. Accordingly, it is possible to reduce an error in judgment about an increase or decrease in evaluation value caused by noises, etc. in the unfocusing position. Further, an overrunning amount of the focusing lens with respect to the focusing position can be reduced in the vicinity of the focusing position. Accordingly, the focusing speed of the focusing lens can be increased.

Figure 6:
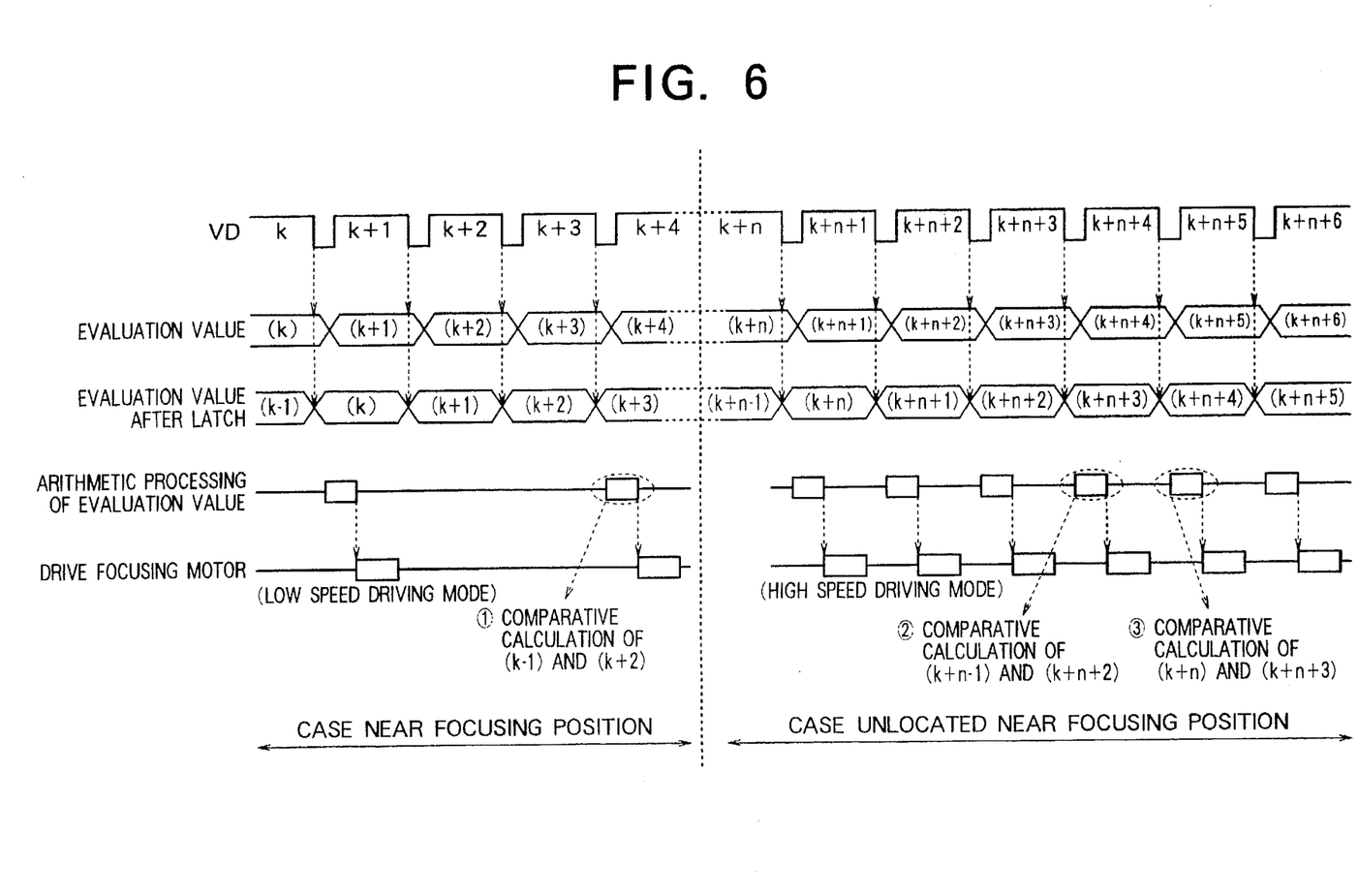
FIG. 6 is a timing chart of an obtained evaluation value, its comparing calculation and the operation of a focusing motor in a focal controller of a camera in accordance with a third embodiment of the present invention.

FIG. 6 is a timing chart of the focal controller of a camera in accordance with a third embodiment of the present invention in which an evaluation value is obtained and a comparing calculation of this evaluation value is made and the focusing motor 12 is driven. A high speed driving mode of the focal controller is set when the focusing motor 12 is driven at a high speed. In this high speed driving mode, the CPU 11 obtains an evaluation value and makes a comparing calculation of this evaluation value every one field. As a result, if the evaluation value is decreasing, the focusing motor 12 is reversely rotated.

In this case, for example, a focal evaluation value is compared with reference data every three fields in consideration of influences of flicker. Namely, as shown by ③ in FIG. 6, a focal evaluation value (k+n+3) in field (k+n+3) is compared with data (k+n) before three fields. The drive of the focusing motor 12 is controlled by results of this comparison. Thus, an overrunning amount of the focusing lens with respect to a position providing a maximum focal evaluation value can be reduced even when the focusing motor 12 is driven at a high speed by judging that no focusing lens is located near a focusing position although the focusing lens is actually located near the focusing position. Accordingly, a bad pickup image can be reduced until a focusing operation, and a focusing time can be shortened.

When the focusing lens is located near the focusing position, the focal evaluation value is arithmetically obtained, for example, at an interval of three fields in consideration of the influences of flicker. Further, the focusing motor 12 is driven at a low speed. Thus, when the focusing lens is located near the focusing position, the overrunning amount of the focusing tens with respect to the focusing position can be minimized. Further, the focusing lens can be accurately stopped in the focusing position.

For example, there is a case in which it is necessary to drive the focusing motor 12 by six steps when the high speed driving mode is set as shown in FIG. 6. In this case, the driving motor 12 is not driven at one time by six steps, but a moving amount of the focusing motor is limited to two steps every vertical drive (VD). The focusing motor 12 is driven in synchronization with a vertical drive period. Thus, it is possible to reduce influences of the motor drive on compared evaluation values such as (k) and (k+3), (k+n) and (k+n+3), etc. in FIG. 6. Accordingly, the evaluation values can be compared with each other with high accuracy so that a reduction in evaluation value from a peak value can be detected reliably and rapidly.

It is effective in detection of two continuous reductions in evaluation value to avoid the influences of noises that a means for reversely rotating the focusing motor 12 reliably judges a reduction in focal evaluation value (namely, a direction far from the focusing position). As mentioned above, in this third embodiment, these reductions in evaluation value are detected while the focusing motor 12 is driven. Accordingly, this judgment has sufficient reliability by only a single detection in the case of a normal photographed subject having a preferable S/N ratio.

Accordingly, for example, when a stepping motor is used as the focusing motor 12 at a time of the high speed driving mode, there is a case in which it is necessary to drive the focusing motor by six steps in accordance with the comparative arithmetic results of evaluation values in a position unlocated near the focusing position. In reality, there is a case in which the focusing lens overruns the focusing position when the focusing motor is driven by six steps from the present position of the focusing lens. In this case, the focusing motor is first driven by three steps. As a result, if an obtained focal evaluation value is reduced for the first time, the next step of the focusing motor is set to one step as a minimum step and the focusing motor is driven and a reduction in evaluation value is then judged.

As mentioned above, there is a case in which no six steps are actually required even when it is judged that it is necessary to drive the focusing motor by six steps. If the reduction in evaluation value is detected in the first three steps, there is a high possibility that the reduction in evaluation value is continuously detected in the next driving step although the next driving step is one step. Thus, it is possible to reliably detect the reduction in evaluation value and reduce an unnecessary overrunning amount of the focusing lens.

When a DC motor except for the stepping motor is used, similar effects can be obtained if a driving speed of the DC motor is controlled instead of control of the number of steps.

In the above third embodiment, the CPU 11 outputs a control signal to the control circuit 13 of the focusing motor in FIG. 2. The above comparative arithmetic calculation is made by the arithmetic circuit 10. However, this comparative arithmetic calculation can be easily made by software of the CPU 11. In this case, the arithmetic circuit 10 can be omitted in the third embodiment.

As explained above, in the focal controller of a camera having a third construction of the present invention, a focusing lens is moved at a high speed in an unfocusing position. In contrast to this, the focusing lens is moved in the vicinity of a focusing position at a low speed in comparison with the unfocusing position. Further, the focal controller obtains detected results (an evaluation value) relative to a brightness component as a base of focusing and unfocusing judgments and compares these detected results with reference data for a long period. Accordingly, an overrunning amount of the focusing lens with respect to the focusing position is restricted and the focusing lens can be accurately stopped in the focusing position.

In a fourth construction of the present invention, when the focusing lens is moved at a high speed, the focusing lens is gradually moved by predetermined amounts until a required moving amount in synchronization with the period for obtaining the evaluation value and making its comparative calculation. Thus, influences of focusing motor drive on the evaluation value as a compared object can be reduced. Accordingly, the evaluation value can be compared with reference data with high accuracy, and the focusing position of the focusing lens is detected rapidly and reliably.

In a fifth construction of the present invention, when the focusing lens is moved at a high speed, no focusing motor is instantly driven until the required moving amount of the focusing lens obtained from the compared results of the evaluation value. In this case, the focusing motor is driven by a moving amount smaller than a predetermined moving amount in a first driving step. As a result, when it is judged by the comparative arithmetic calculation of the evaluation value that the focusing lens is located near the focusing position, the focusing motor is driven at a low speed showing a smaller moving amount. Namely, when it is continuously judged two times that the focusing lens is located near the focusing position, the focusing motor is driven at a low speed showing a smaller moving amount. Thus, the focusing position can be reliably detected and overrun of the focusing lens with respect to the focusing position can be prevented.

Many widely different embodiments of the present invention may be constructed without departing from the spirit and scope of the present invention. It should be understood that the present invention is not limited to the specific embodiments described in the specification, except as defined in the appended claims.

What is claimed is:

1. A focal controller of a camera in which a focusing signal is obtained from a change in brightness component among a video signal obtained by image pickup and a focusing operation is controlled on the basis of this focusing signal;

the focal controller comprising:

means for detecting an increase and a decrease in ratio of brightness components in two arbitrary different frequency bands;

means for detecting an increase and a decrease in brightness component in one of the frequency bands; and means for changing the driving speed of a focusing motor for moving a focusing lens on the basis of judged results of an unfocusing position and a position near a focusing position obtained by detected results of both the detecting means.

2. A focal controller of a camera as claimed in claim 1, wherein the focal controller further comprises means for changing the relation between a threshold value for detecting the increase in brightness component and a threshold value for detecting a maximum value after the detection of this increase in accordance with the unfocusing position and the position near the focusing position.

3. A focal controller of a camera in which a focusing signal is obtained from a change in brightness component among a video signal obtained by image pickup and a focusing operation is controlled on the basis of this focusing signal;

the focal controller comprising:

means for detecting an increase and a decrease in ratio of brightness components in two arbitrary different frequency bands;

means for detecting an increase and a decrease in brightness component in one of the frequency bands; and comparing means for judging a position near a focusing position and an unfocusing position by detected results of both said detecting means, and constructed such that the comparing means sets the driving speed of a focusing motor for moving a focusing lens to a predetermined speed and obtains said detected results and makes a comparative arithmetic calculation of the detected results for a predetermined period when the unfocusing position is judged; and the comparing means sets the driving speed of the focusing motor to a speed lower than said predetermined speed and obtains said detected results and makes the comparative arithmetic calculation for a period longer than said predetermined period when the position near the focusing position is judged.

4. A focal controller of a camera as claimed in claim 3, wherein said focusing motor is driven in synchronization with the period for obtaining said detected results and making the comparative arithmetic calculation such that the driving speed of the focusing motor is limited to a speed providing a predetermined moving amount of the focusing lens every this period.

5. A focal controller of a camera as claimed in claim 3 or 4, wherein the focusing motor is gradually driven at a low speed just after the position near the focusing position is first judged from said detected results, and when the same judgement is made later.

* * * * *